April 9, 1968   J. O. TRIMBLE ET AL   3,377,422
SPLICE ASSEMBLY TO CONNECT CABLE ENDS TOGETHER
Filed Jan. 26, 1966                           2 Sheets-Sheet 1
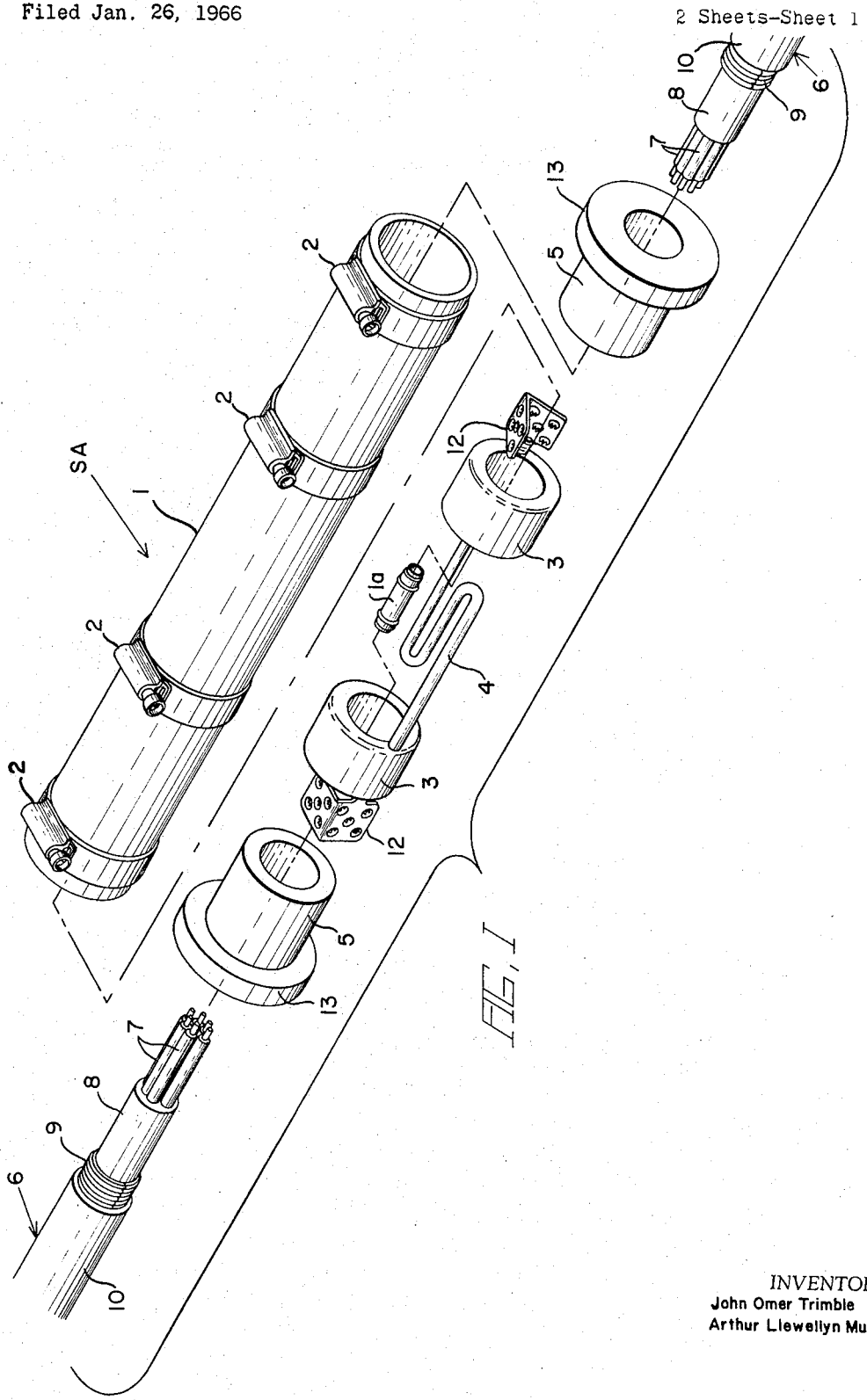
INVENTOR.
John Omer Trimble
Arthur Llewellyn Mueller

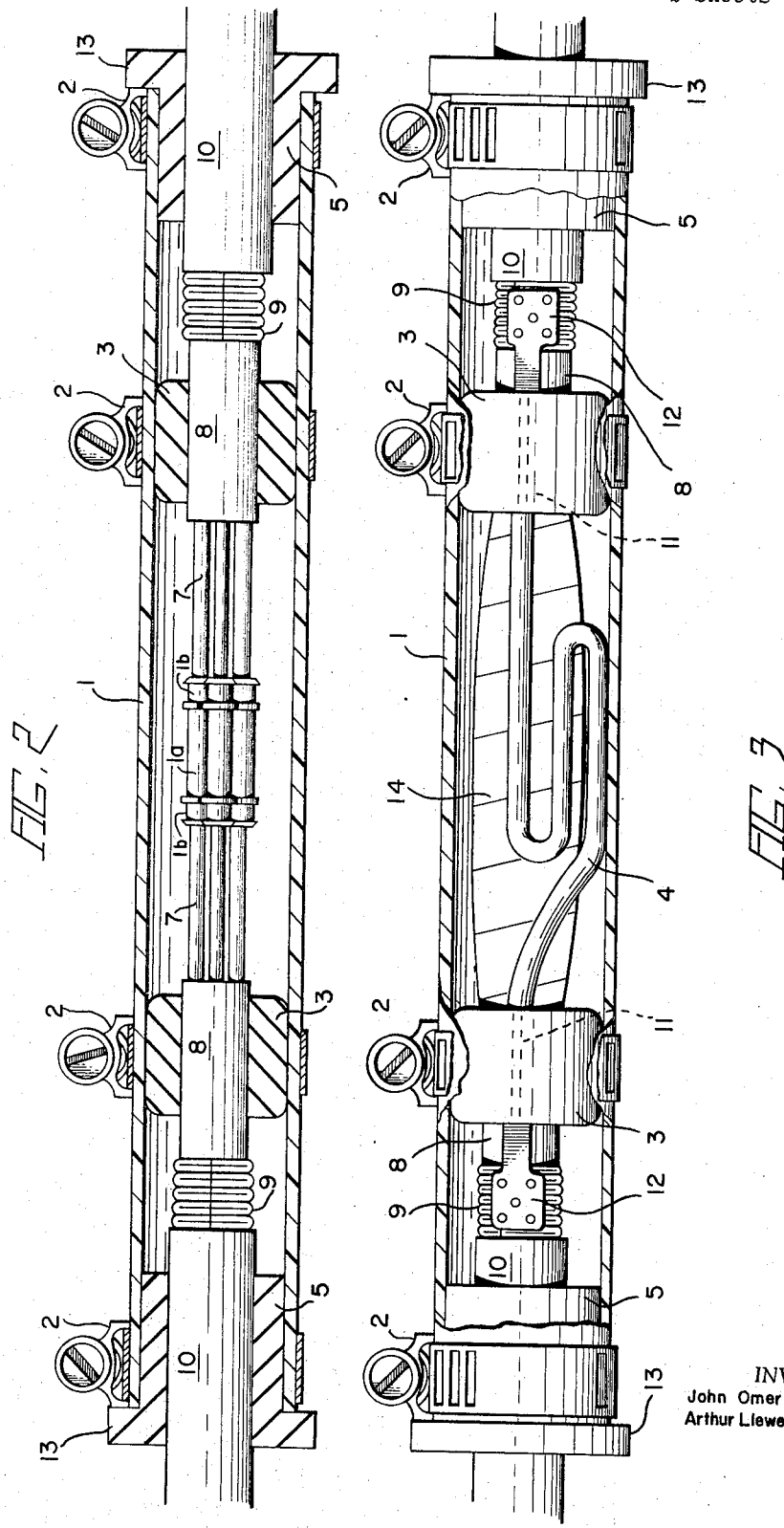

United States Patent Office 3,377,422
Patented Apr. 9, 1968

3,377,422
SPLICE ASSEMBLY TO CONNECT
CABLE ENDS TOGETHER
John Omer Trimble, Malvern, and Arthur Llewellyn
Mueller, Havertown, Pa., assignors to AMP Incorporated, Harrisburg, Pa.
Filed Jan. 26, 1966, Ser. No. 523,202
7 Claims. (Cl. 174—88)

ABSTRACT OF THE DISCLOSURE

A splice assembly for splicing together ends of cable means having a plurality of conductor members, insulation means surrounding the conductor members, shield means surrounding the insulation means and an insulating sheath means surrounding the shield means, the splice assembly comprises connector means for sealingly connecting respective conductor members together, yieldable annular sealing members disposable on the insulation means, connecting means extendable through the sealing members and connectable to the shield means, yieldable plug members disposable on the insulating sheath means, a yieldable unitary sleeve disposable over the sealing members and plug members, and clamping means disposable on said sleeve to sealingly clamp the plug members and sealing members respectively to the insulating sheath means and insulation means.

This invention relates to a splice assembly and more particularly to a splice assembly to connect cable ends together.

Communication cable is being used extensively. When ends of this cable are spliced, the integrity of the splice is a paramount consideration, because, if the splice is not properly sealed, the transmission of intelligence along the cable can be impaired or disrupted. Such a condition is undesirable, not only because of the possibility of a debilitation of the transmisison of intelligence but also the possibility of complete disruption of any transmission of intelligence. The debilitation or disruption of the transmission of intelligence is primarily caused by the splice not being completely sealed to provide a waterproof splice.

An object of the invention is to provide a splice assembly that completely seals the spliced ends of communication cable means without the dependence of applied cements or similar sealing or potting compositions.

Another object of the invention is the provision of a splice assembly which prevents the entrance of moisture, water or other fluids.

A further object of the invention is to provide a splice assembly which will withstand severe weather conditions and is long lasting when used underground.

An additional object of the invention is to provide a splice assembly including means for sealingly protecting the primary circuit means from foreign fluids and means for insuring electrical continuity of the shield.

A still further object of the invention is the provision of a splice assembly which enables a better, quicker, more economical and completely sealed splice of cable means to be obtained whereby loss of signal transmission effectiveness is substantially minimized.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are achieved by a splice assembly for splicing together ends of cable means having a plurality of conductor members, insulation means surrounding the conductor members, shield means surrounding the insulation means and an insulating sheath means surrounding the shield means, the splice assembly comprising connector means for sealingly connecting respective conductor members together, yieldable annular sealing members disposable on the insulation means, connecting means extendable through the sealing members and connectable to the shield means, yieldable plug members disposable on the insulating sheath means, a yieldable unitary sleeve disposable over the sealing members and the plug members, and clamping means disposable on said sleeve to sealingly clamp the plug members and sealing members respectively to the insulating sheath means and insulation means.

In the drawings:

FIGURE 1 is an exploded perspective view of stripped ends of cable means and the splice assembly;

FIGURE 2 is a longitudinal cross-sectional view of the splice assembly in its assembled condition; and FIGURE 3 is a partial cross-sectional view of the splice assembly in its completely assembled condition.

Referring now to the drawings, splice assembly SA comprises a unitary sleeve member 1 having conventional clamp members 2 disposed on the exterior surface thereof and spaced therealong, connector members 1a, annular sealing members 3, shield coupling lead wire 4, and annular plug members 5. The ends of cable means 6 are illustrated in FIGURE 1 as being stripped and ready to be spliced together. Each of cable means 6 is a cable of the multiconductor type which is generally used as communication cable that is capable of transmitting any kind of intelligence therealong. This type of cable includes insulated inner or center conductor members 7, an inner insulating member surrounding conductor member 7, a shield member 9 in the form of a copper or aluminum braid or a spirally wrapped metallic member or welded steel or copper or stainless welded sheath or the like surrounding inner insulating member 8 and an outer insulating sheath surrounding shield member 9. Inner insulating member 8 and outer insulating sheath 10 are made from a suitable dielectric material to accomplish the intended purpose.

Unitary sleeve member 1 is preferably made from an ethylene copolymer material which is readily extrudable in accordance with conventional extrusion techniques. Sleeve member 1 is a yieldable material and is preferably of uniform cross-sectional configuration along the length thereof; however, it is capable of being expanded by the application of heat thereto when necessary. Annular sealing members 3 are preferably made of rubber, plastic or similar material and each of the sealing members has an opening 11 extending longitudinally therethrough parallel to the axis thereof in order to snugly accommodate the conductive portion of lead wire 4 therethrough. Thus, lead wire 4 is stripped to bear the conductive portion thereof at each end which is long enough to extend through each sealing member 3 and provide a sufficient portion to extend outwardly therefrom so that terminal member 12, preferably of the type disclosed in U.S. Patent No. 3,138,-658, can be secured to the end of the conductive portion extending outwardly from sealing members 3. Terminal members 12 are preferably secured to the conductive portion of lead wire 4 via conventional crimping techniques.

As can be discerned, the insulation of lead wire 4 abuts against one end surface of sealing members 3 and terminal members 12 are also disposed in abutting engagement with the other end surface of sealing members 3. Plug members 5 are preferably made of rubber or plastic and each plug member has an annular shoulder 13 at one end thereof.

The splice assembly is used in the following manner: The ends of the cable means to be spliced are evenly cut and appropriately stripped in order to bear sufficient lengths of the conductive portions of conductor members 7, inner insulating member 8 and shield member 9. Annular plug members 5 are placed on outer insulating sheath 10 of each cable means with one plug member being positioned from the stripped end of the outer insulating sheath a distance in excess of the length of sleeve member 1 in order to accommodate this sleeve member which is now placed over the outer insulating sheath of this cable means. Plug members 5 fit snugly on the outer insulating sheaths. Annular sealing members 3 are positioned on respective inner insulating members 8 of the cable means and they fit snugly thereon. Conductor members 7 of each cable means are paired off and the ends of each pair are inserted into a respective connector member 1a and crimped thereto in accordance with conventional crimping techniques set forth in U.S. Patent No. 3,010,183. Connector members 1a not only electrically connect the conductor members disposed therein but they also provide a fluid seal connection therebetween, because ferrule members 1b on each end of the connector members cause the plastic sleeve of the connector members to sealingly engage the insulation of the conductor members when the ferrule members are reduced in diameter under the influence of the crimping dies of the crimping tool. Shield members 9 are longitudinally cut and peeled open so that terminal members 12 are crimped into position thereon thereby providing electrical continuity via shield coupling lead wire 4 between the shield members of the cable means. Connector members 1a and conductor members 7 are wrapped by a suitable binding material 14 such as insulating tape or the like to maintain the insulated and connected conductor members together to make a neater bundle and to keep lead wire 4 spaced therefrom. The binding material extends between sealing members 3 as illustrated in FIGURE 3. Lead wire 4 is folded between sealing members 3 as illustrated in FIGURE 3. Lead wire 4 is sufficiently long enough to provide adequate length so that the distance between engagement of sealing members 3 with respective inner insulating members 8 of each cable means need not be exact. Sleeve member 1 is then positioned over sealing members 3 and clamp members 2 thereover are tightened to secure the sleeve member in position. Plug members 5 are moved along outer insulating sheath 10 and inserted within respective ends of sleeve member 1 until annular shoulders 13 which extend outwardly from the exterior sur- 13 abut against these ends. Clamp members 2 overlying plug members 5 are brought into engagement with shoul- face of sleeve member 1; the clamp members are tightened thereby completing the splice.

With clamp members 2 tightly compressing sleeve member 1, plug members 5 and outer insulating sheath 10 as well as sleeve member 1, sealing members 3 and inner insulating member 8 into tight engagement with each other, the splice assembly forms a highly effective positive fluid tight seal with spaced locations which are: the fluid tight seal between outer insulating sheath 10 and the spaces between plug members 5 and sealing members 3, the space between sealing members 3 and connector members 1a in sealing engagement with the insulation of conductor members 7.

If a break occurs in one of the outer insulating sheath of cable means 6, fluid can penetrate into the space between plug member 5 and sealing member 3, but, since there is a fluid tight seal between sleeve member 1, sealing member 3 and inner insulating member 8, the fluid will not bypass this point. If, however, a break occurs in outer insulating sheath 10 and inner insulating member 8 of a cable means 6, fluid will penetrate into the space between sealing members 3, but it will not penetrate into the sealed connections between connector members 1a and conductor member 7. Thus, the splice assembly provides a highly effective positive fluid tight seal at individually spaced locations therealong.

With clamp members 2 secured in position on sleeve member 1 over respective members 3 and 5, the splice assembly will relieve the spliced ends of the cable means from mechanical strains that result from movement of the cable means. Thus, the splice assembly provides a trouble free splice that is mechanically as strong as the cable means. The connections formed by connector members 1a will not become disconnected under the influence of vibration or other kinds of conditions that would cause the connections to be disconnected. The plastic material employed in the splice assembly is resistant to the influence of moisture and corrosion, and it does not have a tendency to undergo distortion or to crack as a result of aging. The splice assembly can be used on metal-sheathed cable means or other types of cable means for critical as well as noncritical circuits. The steps necessary to make the splice are greatly simplified, and, if it becomes essential to disconnect the splice, this can be very readily accomplished. Since sleeve member 1 is capable of being expanded, it can be applied to different sizes of cable means. Annular sealing members and plug members can be made of the same material as that of the sleeve member.

As can be discerned, there has been disclosed a novel and unique splice assembly that is capable of being readily assembled to splice the ends of cable means together and to provide complete fluid seals at space locations therealong.

It will, therefore, be appreciated that the aforementioned and other desirable objects have been achieved; however, it should be emphasized that the particular embodiment of the invention, which is shown and described herein, is intended as merely illustrative and not as restrictive of the invention.

What is claimed is:

1. An article of manufacture comprising a splice assembly unit for splicing together ends of cable means having a plurality of conductor members, insulation means surrounding said conductor members, shield means surrounding said insulation means and an insulating sheath means surrounding said shield means, said splice assembly unit comprising connector means for sealingly connecting respective conductor members together, yieldable annular sealing members disposable on said insulation means, connecting means extendable through said sealing members and connectable to said shield means, yieldable plug members disposable on said insulating sheath means, a yieldable unitary sleeve disposable over said sealing members and said plug members, and clamping means disposable on said sleeve to sealingly clamp said plug members and sealing members respectively to said insulating sheath means and insulation means.

2. A splice assembly according to claim 1 wherein said plug members include shoulders to limit their movement within said sleeve and against which said clamping means abut.

3. A splice assembly according to claim 1 wherein wrapping means is disposable around said conductor members and said connector means between said sealing members.

4. A splice assembly joining together ends of cable having an exterior sheath, a metallic sheath thereunder, an inner sheath and multi-conductors, said splice assembly comprising connector members sealingly connecting respective pairs of said multi-conductors, yieldable annular sealing members disposed on the inner sheaths, connecting means including wire means extending through said annular sealing members and terminal means connected to the metallic sheaths providing electrical continuity therebetween, yieldable plug members disposed on the exterior sheaths, yieldable sleeve means extending around and along said plug members, sealing members and connector members with said sleeve means being in engagement with said plug members and sealing members, and clamp means on an exterior surface of said sleeve means overlying said plug members and sealing members, said clamp means tightly clamping said sleeve means to said plug members and said sealing members which in turn are tightly engaged with said exterior and interior sheaths to create spaced and sealed sections along said splice assembly.

5. A splice assembly according to claim 4 wherein said plug members have shoulders to limit their movement within said sleeve means and against which said clamp means overlying said plug members abut.

6. A splice assembly according to claim 4 wherein wrapping means is disposed around said multi-conductors and said connector members between said sealing members.

7. A splice assembly according to claim 4 wherein said wire means is provided with a fold to permit play therein.

References Cited

UNITED STATES PATENTS

| | | | |
|---|---|---|---|
| 3,054,847 | 9/1962 | Colbert | 174—93 X |
| 3,280,247 | 10/1966 | Channell et al. | 174—93 |

FOREIGN PATENTS

| | | |
|---|---|---|
| 723,457 | 2/1955 | Great Britain. |
| 177,138 | 11/1961 | Sweden. |

DARRELL L. CLAY, *Primary Examiner*.